(12) United States Patent
Xu et al.

(10) Patent No.: US 11,905,720 B2
(45) Date of Patent: Feb. 20, 2024

(54) BUILDING MATERIAL INSTALLATION EQUIPMENT WITH HIGH FLEXIBILITY

(71) Applicant: ZHEJIANG DINGLI MACHINERY CO., LTD., Huzhou (CN)

(72) Inventors: Zhong Xu, Huzhou (CN); Shugen Xu, Huzhou (CN)

(73) Assignee: ZHEJIANG DINGLI MACHINERY CO., LTD., Huzhou (CN)

( * ) Notice: Subject to any disclaimer, the term of this patent is extended or adjusted under 35 U.S.C. 154(b) by 0 days.

(21) Appl. No.: 17/896,561

(22) Filed: Aug. 26, 2022

(65) Prior Publication Data
US 2023/0304311 A1 Sep. 28, 2023

(30) Foreign Application Priority Data
Dec. 31, 2021 (CN) .......................... 202111655121.6

(51) Int. Cl.
E04G 21/16 (2006.01)
(52) U.S. Cl.
CPC .................................. E04G 21/168 (2013.01)
(58) Field of Classification Search
CPC ....... E04G 21/168; E04G 21/14; E04G 21/16; E04G 21/1841; E04F 21/1805; B25J 15/06
USPC ............................................... 414/10–12, 23
See application file for complete search history.

(56) References Cited

U.S. PATENT DOCUMENTS

| 5,944,476 A * | 8/1999 | Bacchi ............. H01L 21/68707 414/816 |
| 6,817,923 B2 * | 11/2004 | Smith ................... B24B 37/345 451/5 |
| 7,766,596 B2 * | 8/2010 | Smith ..................... E04G 21/16 701/50 |
| 9,908,763 B2 * | 3/2018 | Bagge .................. B66F 9/0655 |
| 2008/0093371 A1 * | 4/2008 | Ubidia ..................... B25J 9/041 901/14 |
| 2008/0197744 A1 * | 8/2008 | Herbold .............. H02K 13/003 310/71 |

* cited by examiner

Primary Examiner — Lynn E Schwenning
(74) Attorney, Agent, or Firm — Olive Law Group, PLLC

(57) ABSTRACT

Building material installation equipment includes: a sucking device for sucking panels, a rotating device for driving the sucking device to rotate, a cross translation device, a swinging device and a mechanical arm; a slip ring is arranged in the rotating device and electrically connected with the sucking device; the cross translation device comprises longitudinal translation plate and transverse translation plate which are capable of driving the sucking device to make a translational movement; the longitudinal translation plate and the transverse translation plate are arranged in a direction parallel to gravity, and are fitted; and the swinging device can drive the cross translation device to swing to one side of the mechanical arm.

8 Claims, 13 Drawing Sheets

BUILDING MATERIAL INSTALLATION EQUIPMENT WITH HIGH FLEXIBILITY

CROSS REFERENCE TO RELATED APPLICATIONS

This application claims priority to and the benefit of Chinese Patent Application No. 2021116551216, filed on Dec. 31, 2021, the disclosure of which is incorporated by reference herein in its entirety.

TECHNICAL FIELD

The present disclosure relates to the technical field of high-altitude building material installation equipment, in particular to building material installation equipment with high flexibility.

BACKGROUND ART

In modern architectural design, in order to improve the overall attractiveness, lighting, etc. of buildings, large-area glass curtain walls or marble curtain walls and other special walls are usually designed on the buildings. These walls are usually formed by a plurality of panels jointly, installation angles, positions and heights of the panels are differently affected by actual requirements, these panels usually have the features that a single panel is large in area and heavy, and thus installation equipment capable of lifting the panels to a corresponding height and properly adjusting the positions of the panels is needed.

A Chinese patent discloses a multi-dimensional glass installation robot [application number: CN201820674316.2, and publication number: CN208575835U], comprising a multi-dimensional installation machine head, a telescopic mechanical arm and a rotating walking chassis; the multi-dimensional installation machine head is installed on the telescopic mechanical arm; the telescopic mechanical arm is installed on the rotating walking chassis; and the multi-dimensional installation machine head comprises an up-and-down sliding unit, a left-and-right rotating unit, an overturning unit, a rotating unit and a translation unit. Although the multi-dimensional glass installation robot can lift the panels to a designated height and adjust relative positions of the panels in multiple dimensions according to the technical solution of the patent, it cannot drive the panels to extend into a narrow installation space when encountering a certain groove-shaped narrow installation space. Thus, the technical solution of the patent is poor in flexibility and narrow in application range when encountering certain special installation environments.

The present disclosure provides building material installation equipment with high flexibility and wide application range in order to solve the above problems.

SUMMARY

The present disclosure provides building material installation equipment with high flexibility and wide application range.

The above technical objective of the present disclosure is achieved by the following technical solution:

Building material installation equipment with high flexibility comprises: a sucking device for sucking panels, a rotating device for driving the sucking device to rotate, a cross translation device, a swinging device and a mechanical arm; a slip ring is arranged in the rotating device and electrically connected with the sucking device to supply power and transmit electric signals to the sucking device; the cross translation device comprises longitudinal translation plate and transverse translation plate which is capable of driving the sucking device to make a translational movement; the longitudinal translation plate and the transverse translation plate are arranged in a direction parallel to gravity, and are fitted; and the swinging device can drive the cross translation device to swing to one side of the mechanical arm.

During actual use, the equipment can be installed on a mobile platform, such as a trolley, by the mechanical arm, thereby driving the equipment to move to a designated installation region by the trolley. After panels to be installed are sucked by the sucking device, the panels are lifted to a needed height by corresponding equipment on the trolley and the mechanical arm, and the positions of the panels are roughly adjusted by the mechanical arm. When encountering a groove-shaped narrow installation space, the swinging device is controlled to act to drive the cross translation device and then drive the sucking device to swing to one side of the mechanical arm. As the transverse translation plate and the longitudinal translation plate are arranged in the direction parallel to gravity, and are mutually fitted, the structural arrangement of the cross translation device is compact, the space occupied by the cross translation device is reduced, and the cross translation device and the sucking device can more easily extend into the narrow installation space accordingly. When extending into the installation space, the cross translation device can be used for adjusting relative positions of the panels. On the other hand, after the panels are lifted to a certain height by the mechanical arm, an included angle is bound to exist between the mechanical arm and a horizontal plane, after the sucking device swings to one side of the mechanical arm by the swinging device, the rotating device is needed to drive the sucking device to rotate by a certain angle to adjust the positions of the panels, and therefore the panels can align at installation positions. Due to the adoption of the slip ring, rotation of the sucking device cannot be limited by the rotating angle of the rotating device, so as to prevent the situation that the panels cannot align at the installation positions as the angle of the rotating device is limited. In conclusion, according to the present disclosure, in the case of the specific working condition of the narrow installation space, the relative positions of the panels can be adjusted to a certain degree while the panels align at the installation positions, and therefore installation requirements can be effectively met.

As the preference of the present disclosure, the longitudinal translation plate are slidably connected with the swinging device, and longitudinal push rods are arranged on the longitudinal translation plate to push the longitudinal translation plate to make a translational movement relative to the swinging device.

As the preference of the present disclosure, an installation plate and a connecting plate are arranged on the same side of the longitudinal translation plate; the installation plates are clamped at the two ends of the swinging device; the two sides of the connecting plates are connected with the installation plates and the longitudinal push rods respectively; and longitudinal sliding rails are further arranged on the connecting plates and connected with the longitudinal translation plate.

As the preference of the present disclosure, a plurality of reinforcing plates are further arranged on the sides, close to the swinging device, of the longitudinal translation plate; the adjacent reinforcing plates are spaced; and the longitudinal sliding rails extend into an interval between two adjacent reinforcing plates.

As the preference of the present disclosure, the transverse translation plate are slidably connected with the longitudinal translation plate and connected with the sucking device through the rotating device; and transverse push rods are arranged on the transverse translation plate to push the transverse translation plate to make a translational movement relative to the longitudinal translation plate.

As the preference of the present disclosure, the transverse translation plate is clamped at the two ends of the longitudinal translation plate; transverse sliding rails are arranged between the transverse translation plate and the longitudinal translation plate; installation portions are further arranged on the transverse translation plate; the installation portions are used for installing the transverse push rods; and the installation portions are arranged at one end of each of the longitudinal translation plate.

As the preference of the present disclosure, there are two transverse sliding rails; one transverse sliding rail is arranged at the ends, away from the transverse push rods, of the longitudinal translation plate; and the lower transverse sliding rail is arranged on the sides, away from the swinging device, of the longitudinal translation plate.

As the preference of the present disclosure, installation grooves are further formed in the sides, away from the longitudinal translation plate, of the transverse translation plate; and the rotating device is arranged in the installation grooves.

As the preference of the present disclosure, the sucking device comprises a plurality of suckers and a support for installing the suckers; the support is connected with the rotating device; and the suckers are electrically connected with the slip ring.

As the preference of the present disclosure, a rotating ring is arranged on the rotating device; the rotating ring is connected with the sucking device; and a central axis of the slip ring coincides with a rotating axis of the rotating ring.

In conclusion, the present disclosure can have the following beneficial effects:

The slip ring is arranged in the rotating device, and used for supplying power and providing electric signals to the sucking device, so that connecting lines of the sucking device and other components are effectively prevented from being wound and broken during rotating, rotation of the rotating device is not limited by the angle accordingly, and therefore the positions of the panels can be more flexibly adjusted by the rotating device.

Due to the structural layout of the installation plates, the connecting plates, the longitudinal sliding rails, the reinforcing plates and the longitudinal push rods, the longitudinal translation plate are more compactly connected with the swinging device, which facilitates reduction in the interval between the sucking device and the swinging device.

Due to the structural layout of the transverse push rods, the installation portions and the transverse sliding rails, the transverse connecting plates are more compactly connected with the longitudinal connecting plates, which facilitates reduction in the interval between the sucking device and the swinging device.

Due to the installation grooves, the transverse translation plate are more compactly connected with the rotating device, which facilitates reduction in the interval between the sucking device and the swinging device.

By reducing the interval between the sucking device and the rotating device, the equipment can extend into the narrow working space in a state of sucking the panels, and can still have certain flexibility after entering the narrow space, thus, the positions of the panels can be adjusted, and then actual installation requirements can be met.

By reducing the interval between the sucking device and the rotating device, the overall length of the installation equipment is reduced, which facilitates improvement in the bearing performance of the installation equipment.

IN THE DRAWINGS

Figure 1:
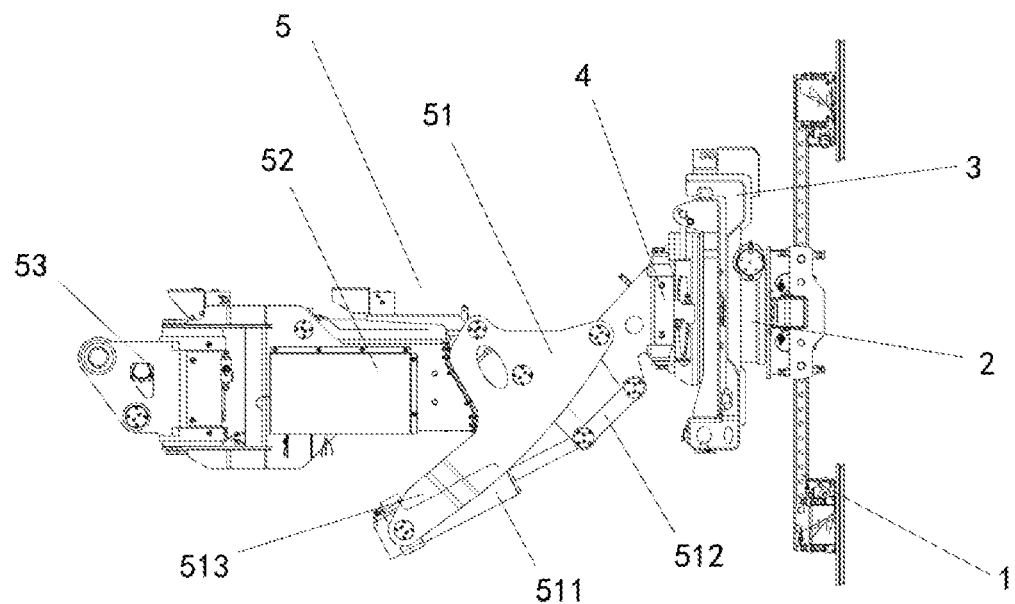
FIG. 1 is a structural schematic diagram of a sucking type transferring device in building material installation equipment with high flexibility.
Figure 2:
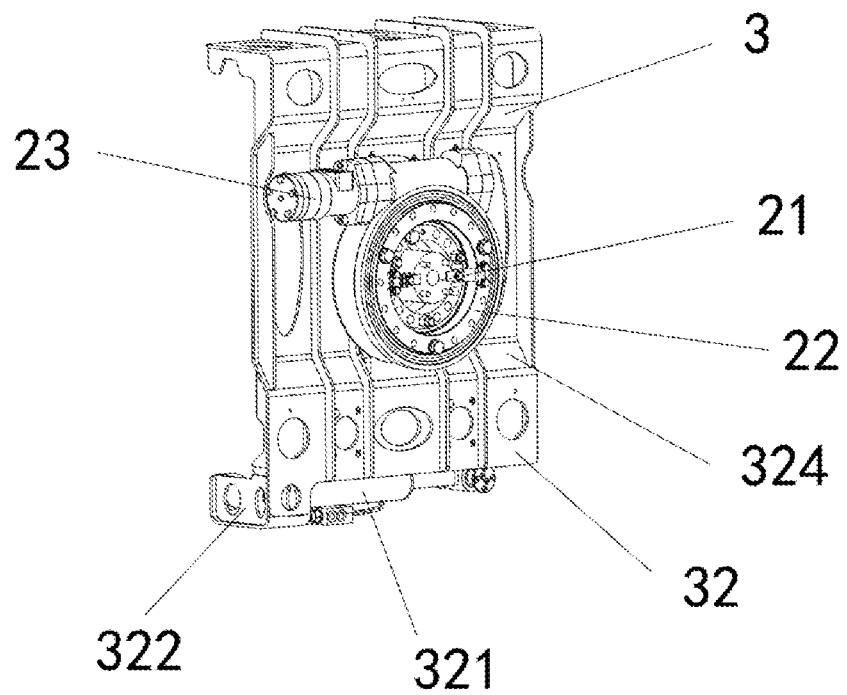
FIG. 2 is a structural schematic diagram of a rotating device.
Figure 3:
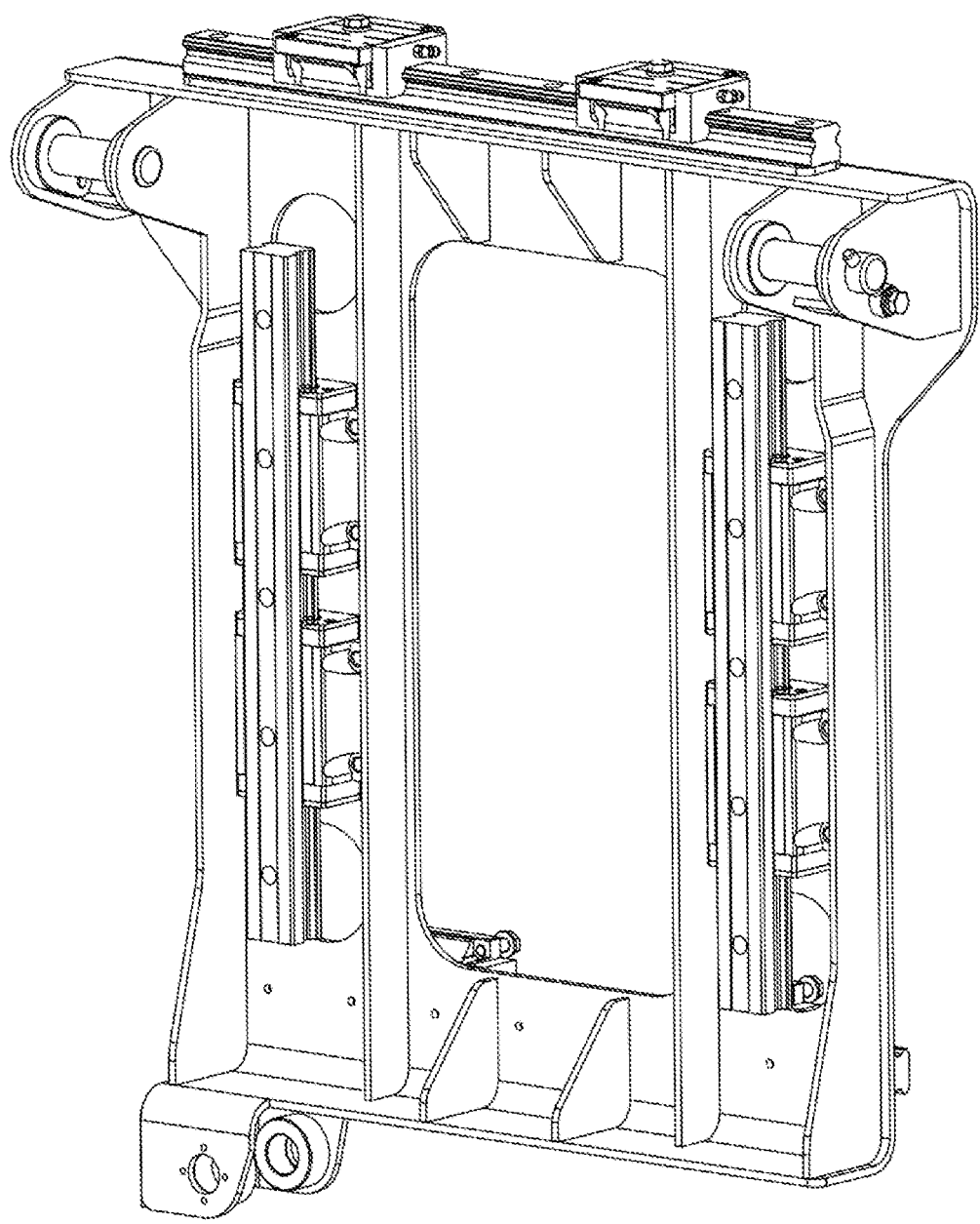
FIG. 3 is a structural schematic diagram of a longitudinal translation plate.
Figure 4:
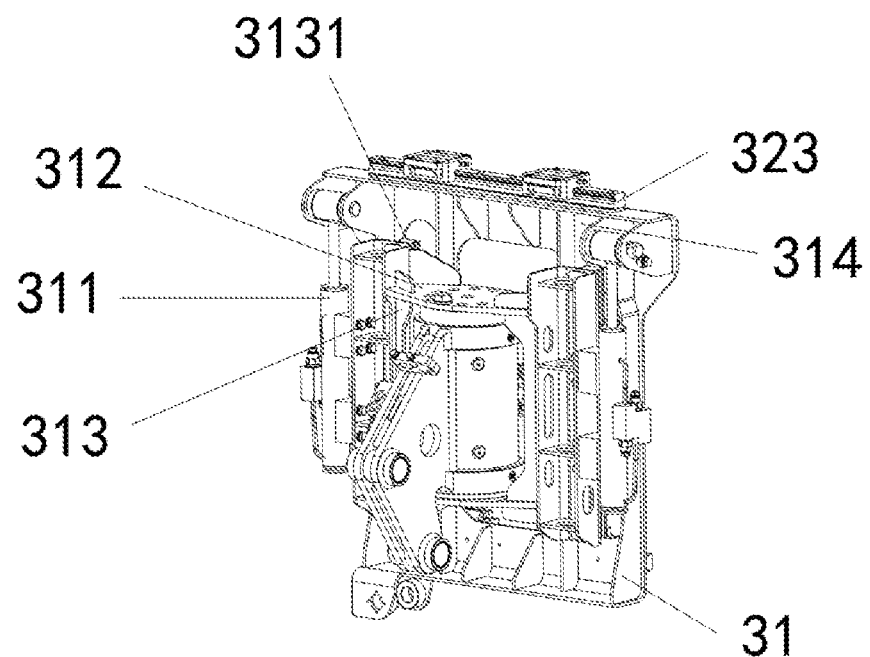
FIG. 4 is a structural schematic diagram of a transverse translation plate.
Figure 5:
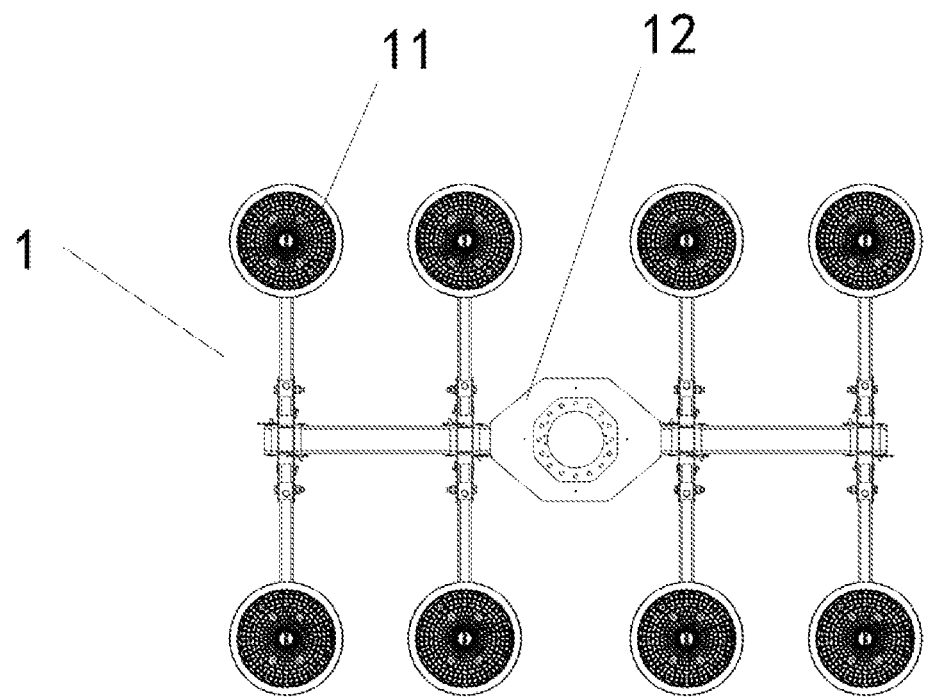
FIG. 5 is a schematic diagram of a front structure layout on a sucker side of a sucking type transferring device.
Figure 6:
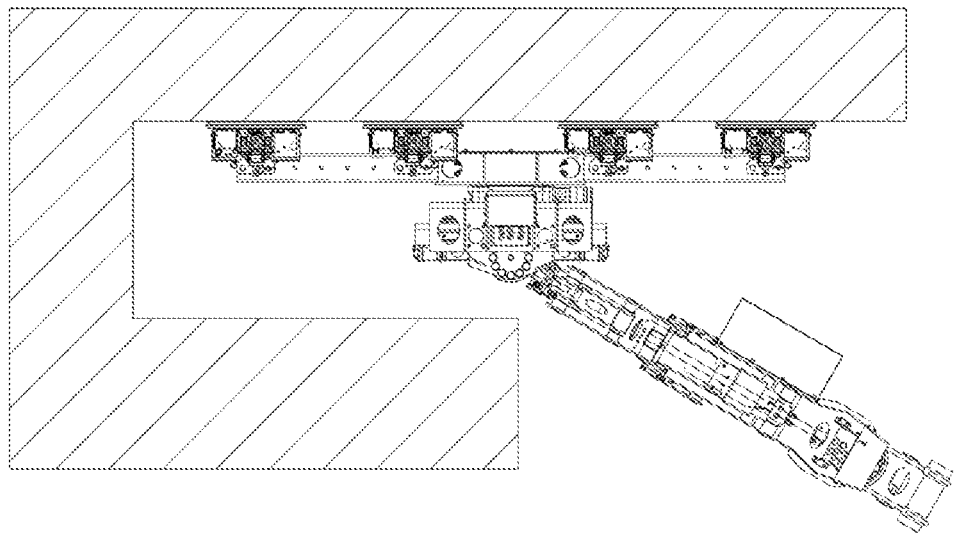
FIG. 6 is a schematic diagram showing a state that a sucking type transferring device sucks workpieces fixedly.
Figure 7:
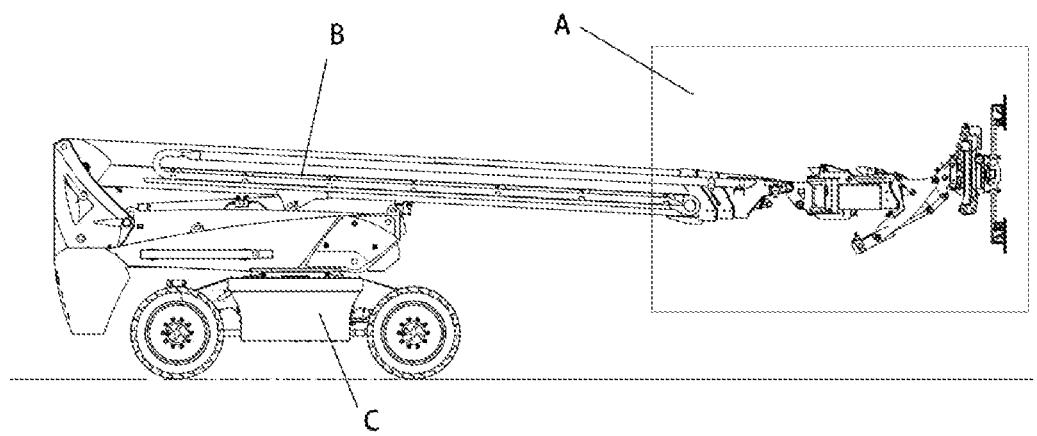
FIG. 7 is a schematic diagram of an overall structure of a side face of building material installation equipment with high flexibility.
Figure 8:
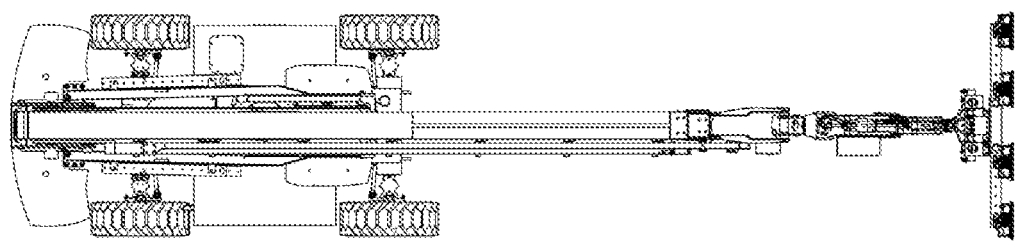
FIG. 8 is a structural schematic diagram of a top view of building material installation equipment with high flexibility.
Figure 9:
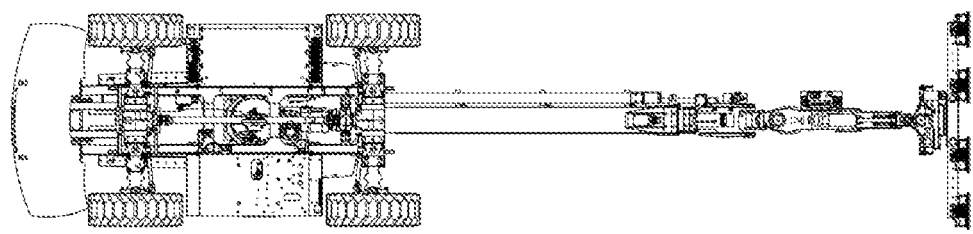
FIG. 9 is a structural schematic diagram of a bottom view of building material installation equipment with high flexibility.
Figure 10:
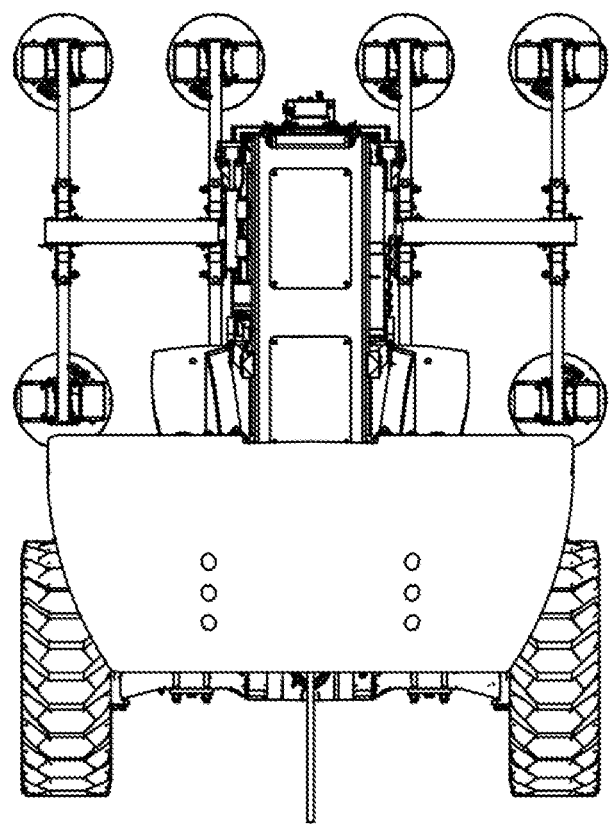
FIG. 10 is a structural schematic diagram of a back view of building material installation equipment with high flexibility.
Figure 11:
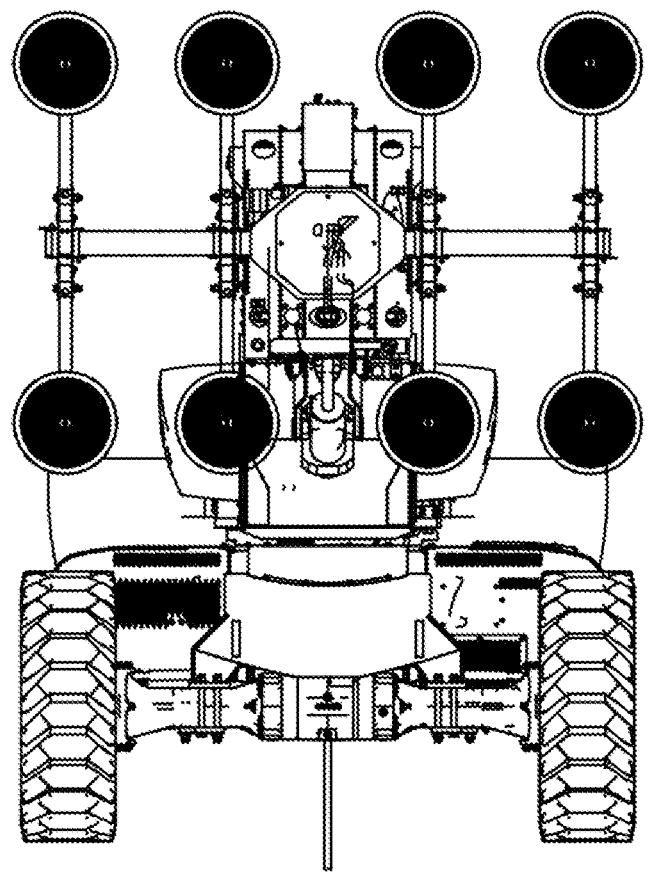
FIG. 11 is a structural schematic diagram of a front view of building material installation equipment with high flexibility.
Figure 12:
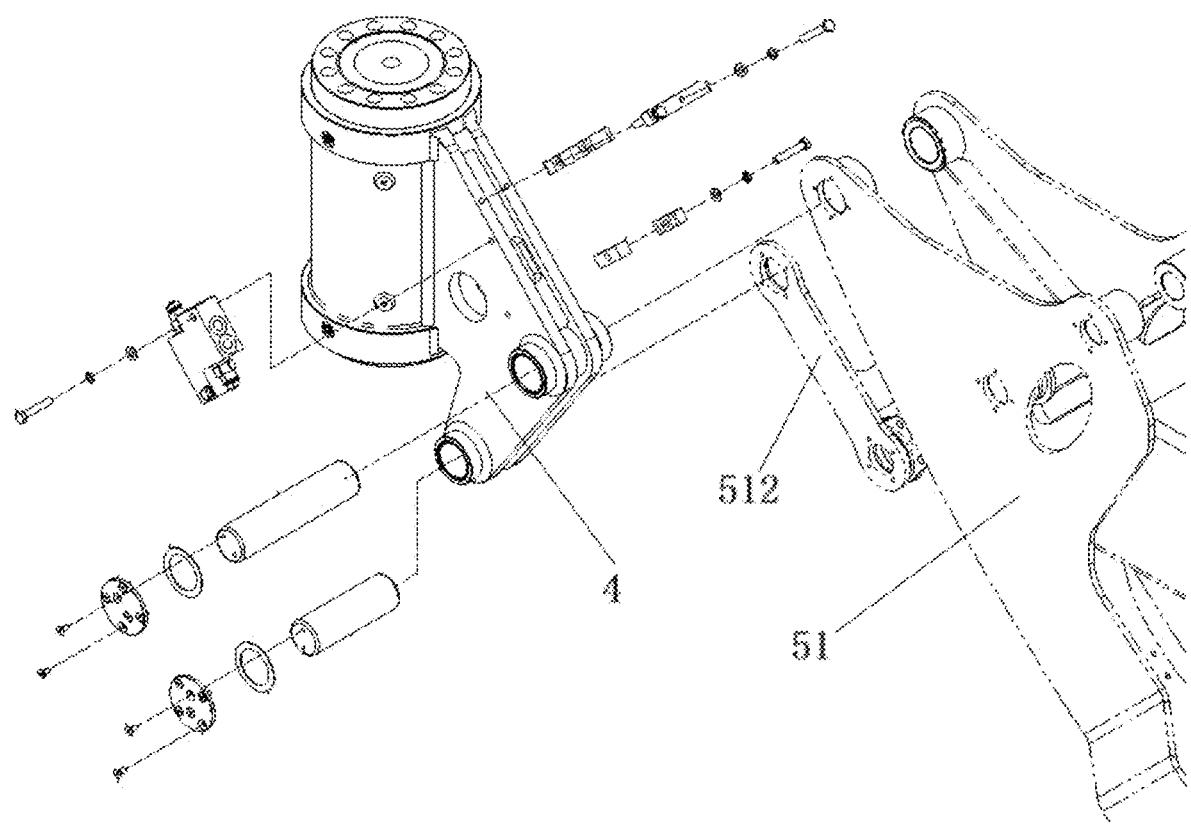
FIG. 12 is an exploded view of some parts of building material installation equipment with high flexibility in an embodiment according to the present disclosure.
Figure 13:
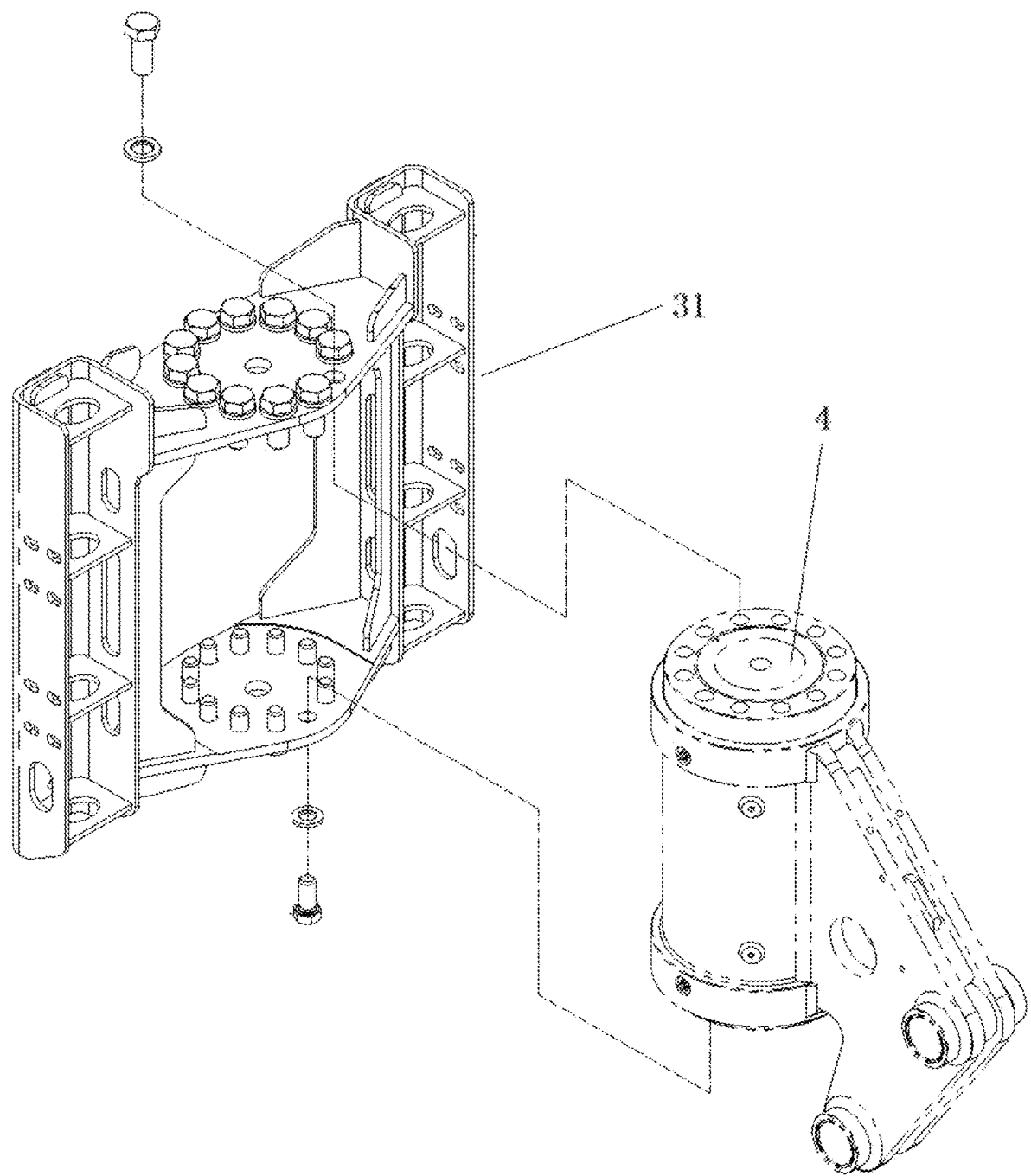
FIG. 13 is an exploded view of some parts of building material installation equipment with high flexibility in an embodiment according to the present disclosure.
Figure 14:
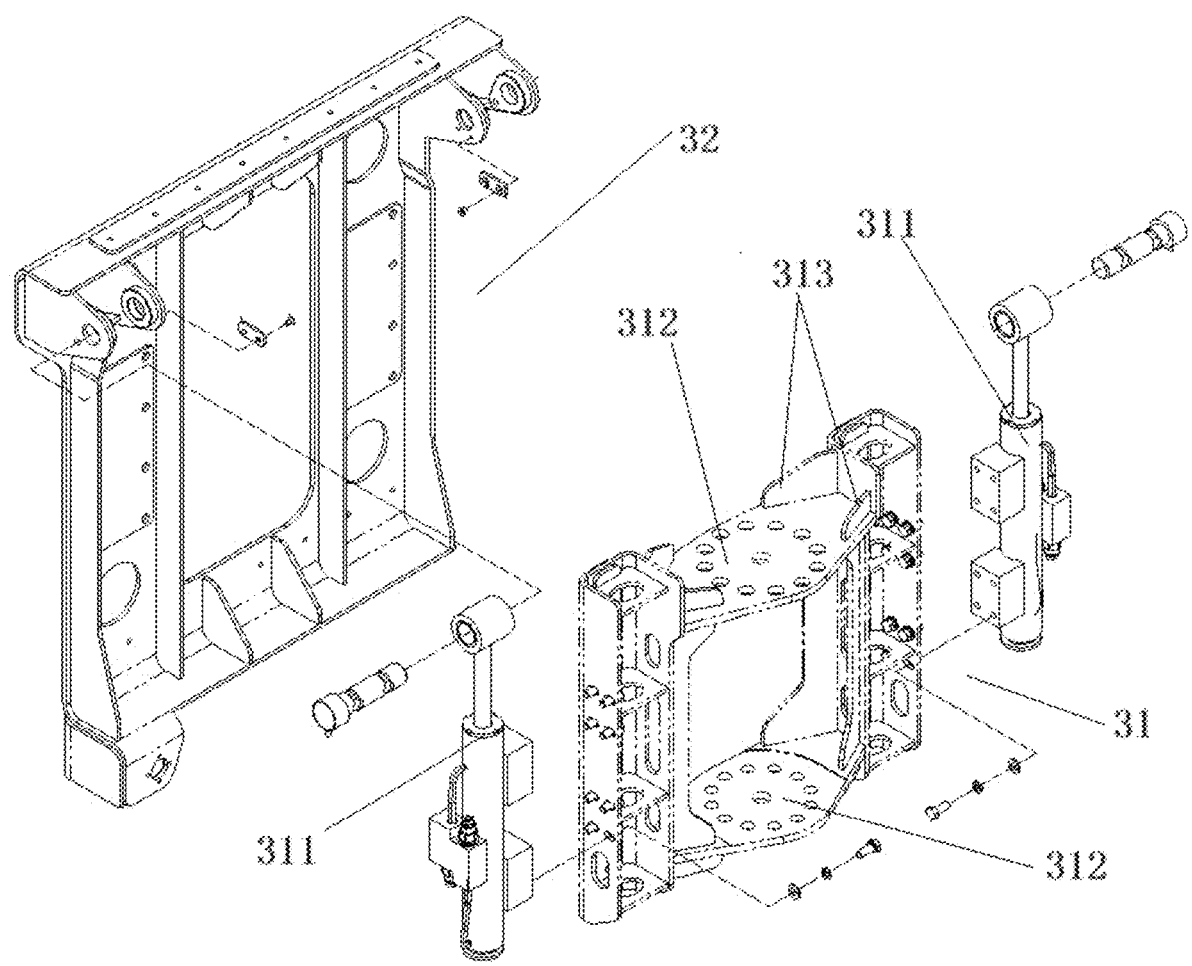
FIG. 14 is an exploded view of some parts of building material installation equipment with high flexibility in an embodiment according to the present disclosure.
Figure 15:
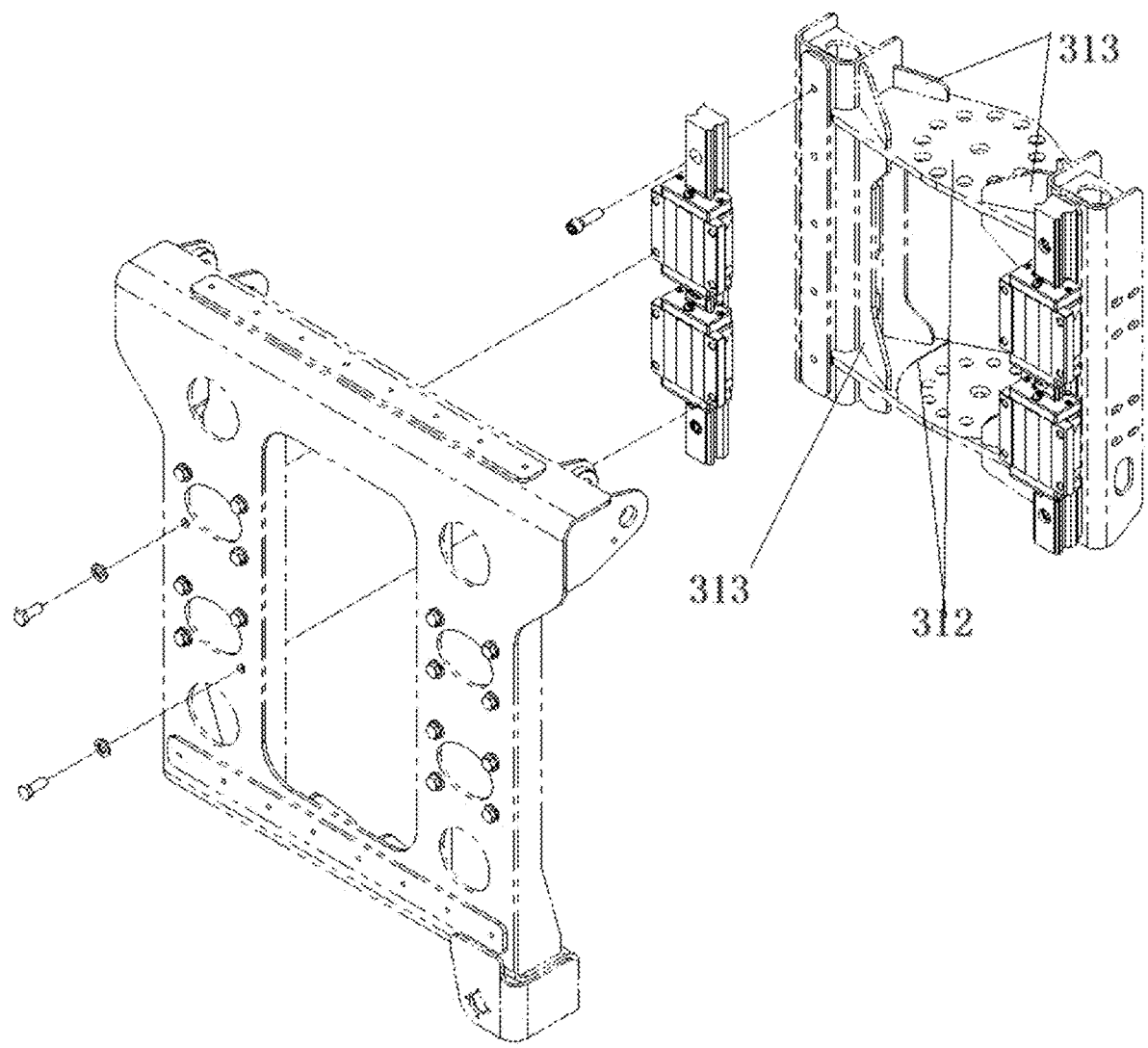
FIG. 15 is an exploded view of some parts of building material installation equipment with high flexibility in an embodiment according to the present disclosure.
Figure 16:
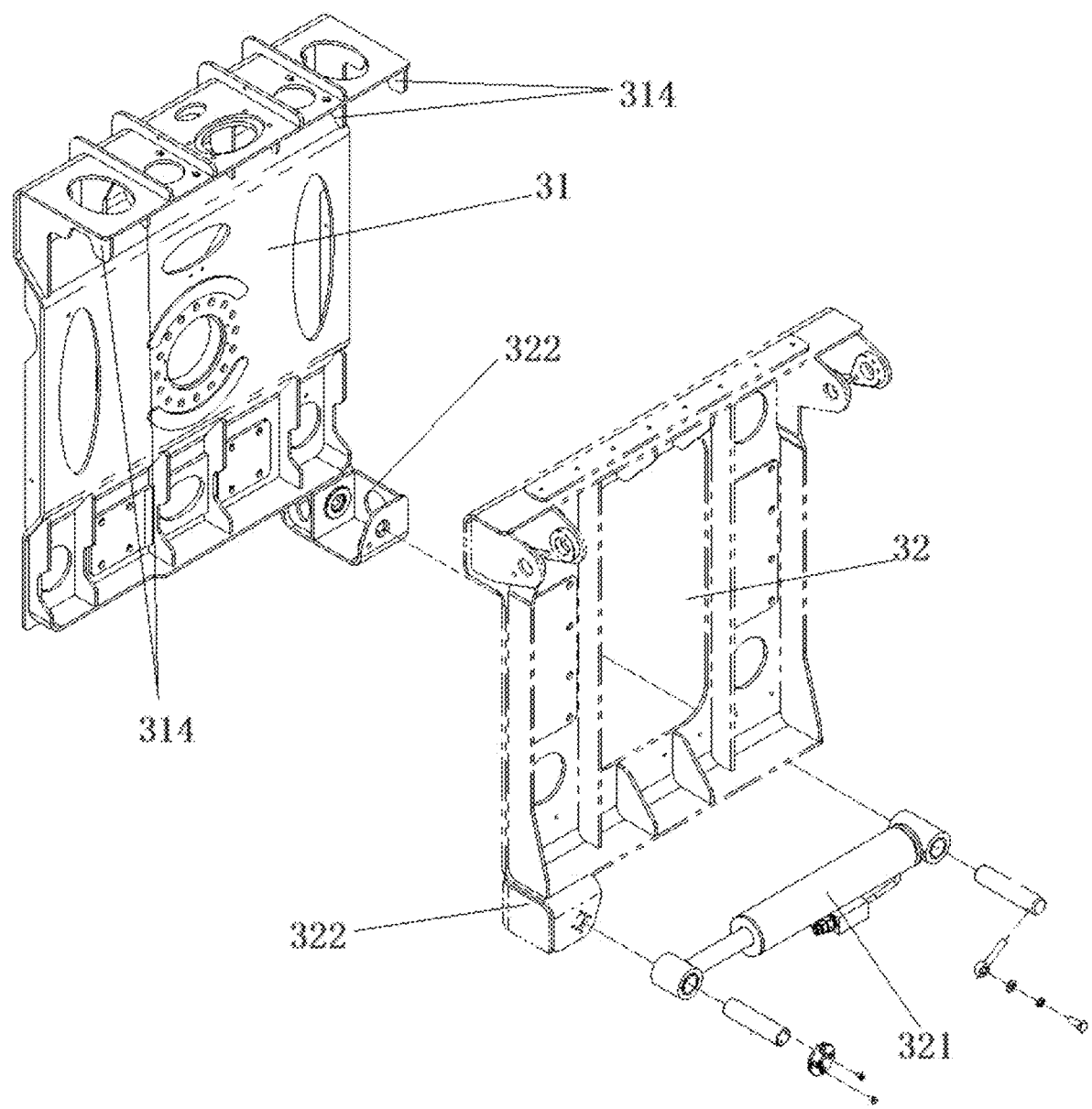
FIG. 16 is an exploded view of some parts of building material installation equipment with high flexibility in an embodiment according to the present disclosure.
Figure 17:
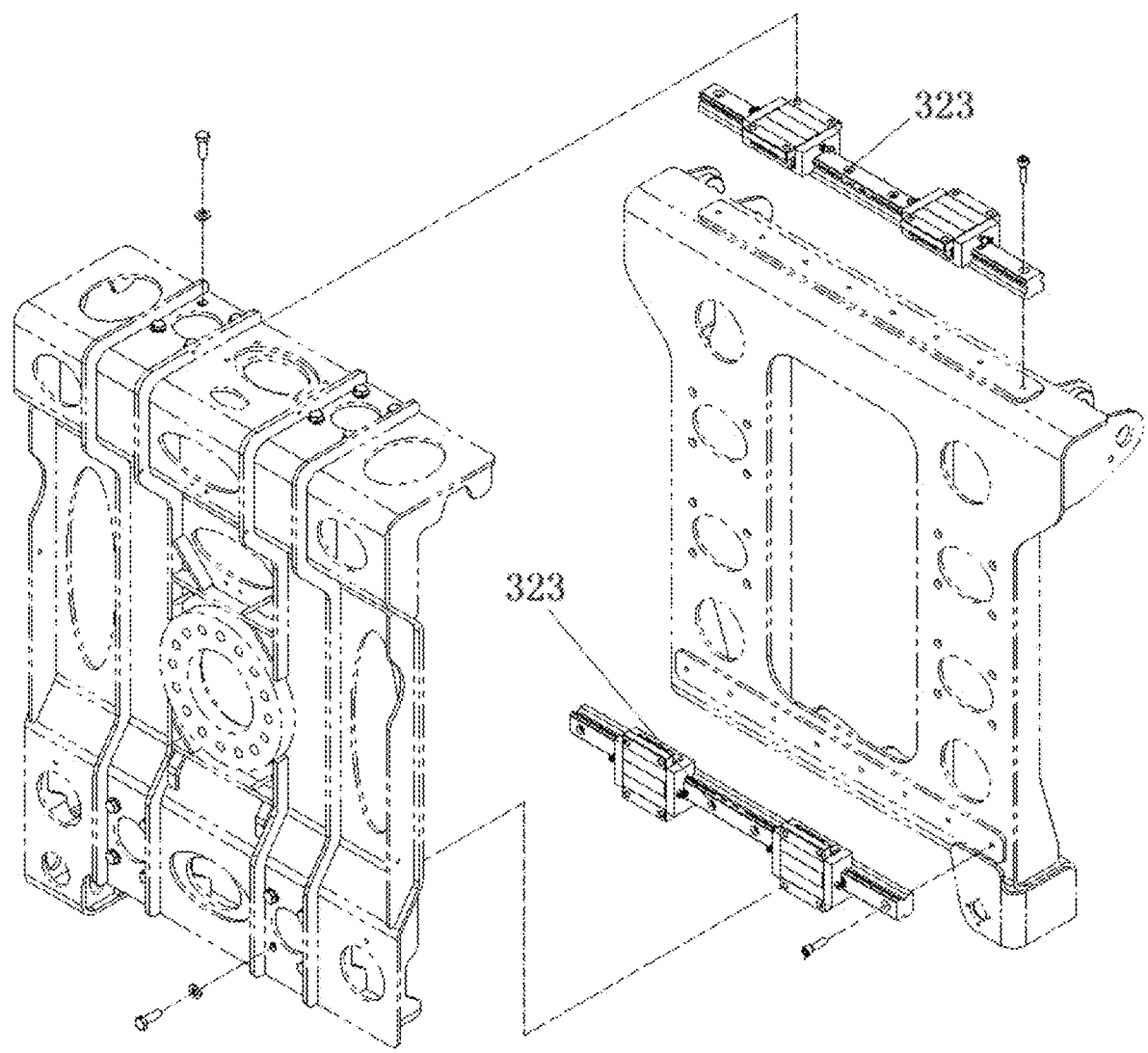
FIG. 17 is an exploded view of some parts of building material installation equipment with high flexibility in an embodiment according to the present disclosure.

A-Sucking type transferring device;
B-Lifting arm;
C-Mobile bearing rack;
1-Sucking device, 11-Sucker, and 12-Support;
2-Rotating device, 21-Slip ring, 22-Rotating ring, and 23-Driving device;

3-Cross translation device, 31-Longitudinal translation plate, 311-Longitudinal push rod, 312-Installation plate, 313-Connecting plate, 3131-Longitudinal sliding rail; 314-Reinforcing plate, 32-Transverse translation plate, 321-Transverse push rod, 322-Installation portion, 323-Transverse sliding rail, and 324-Installation groove;

4-Swinging device; and

5-Mechanical arm, 51-Pitching device, 511-Transmission oil cylinder, 512-Transmission connecting rod, 513-Main plate, 52-Telescopic device, and 53-Secondary swinging device.

DETAILED DESCRIPTION OF THE EMBODIMENTS

The specific embodiment below only explains the present disclosure instead of limiting it, those skilled in the art can make modifications on the embodiment without creative contributions according to requirements after reading the specification, but the modifications are protected by patent laws as long as they fall within the scope of claims of the present disclosure.

The solution is achieved by the following technical means:

Building material installation equipment with high flexibility comprises a sucking device 1, a rotating device 2, a cross translation device 3, a swinging device 4 and a mechanical arm 5, and a sucking type transferring device A is formed by the above five devices on the whole. In the sucking type transferring device A, one side of the cross translation device 3 is connected with the sucking device 1 through the rotating device 2. The other side of the cross translation device 3 is connected with the mechanical arm 5 through the swinging device 4.

Specifically, the sucking device 1 comprises suckers 11 and a support 12. The support 12 is connected with the rotating device 2. A plurality of fulcrum bars are usually arranged on the support 12. The fulcrum bars are mutually parallel, and every two adjacent fulcrum bars are spaced apart. The fulcrum bars extend from a position where the support 12 is connected with the rotating device 2 to two sides. The end of each fulcrum bar is at least connected with one sucker 11. Each sucker 11 is a vacuum device, and can suck panels with smooth surfaces.

A slip ring 21, a rotating ring 22 and a driving device 23 are arranged on the rotating device 2. The driving device 23 and the rotating ring 22 are arranged in the same plane parallel to a gravity direction, so as to reduce an interval between the sucking device 1 and the cross translation device 3. The driving device 23 is in transmission connection with the rotating ring 22, and the rotating ring 22 can drive the sucking device 1 to rotate when driven by the driving device 23. A central axis of the slip ring 21 coincides with a rotating axis of the rotating ring 22. The slip ring 21 is electrically connected with the suckers 11 to supply power and transmit electric signals to the suckers 11. By means of the slip ring 21, connecting lines between the sucking device 1 and other devices can be effectively prevented from being wound and broken when the sucking device 1 rotates, so that rotation of the sucking device 1 is not limited by the rotating angle. The slip ring 21 is the prior art, wherein the specific working mechanism is not repeated here.

The cross translation device 3 comprises a longitudinal translation plate 31 and a transverse translation plate 32. The longitudinal translation plate 31 is of an approximately rectangular plate structure, and is arranged in the direction parallel to gravity. A longitudinal push rod 311, an installation plate 312 and a connecting plate 313 are arranged on one side of each longitudinal translation plate 31. The installation plates 312 are clamped at the two ends of the swinging device 4. When the swinging device 4 acts, the cross translation device 3 can be driven to synchronously swing by the installation plates 312. Meanwhile, a certain interval is reserved between the swinging device 4 and the longitudinal translation plate 31, so as to reserve a certain motion space for the swinging process. Each connecting plate 313 is a U-shaped plate, and a plurality of reinforcing structures for improving the structural strength of the connecting plate 313 are evenly arranged in each connecting plate 313. There are two connecting plates 313 fixedly connected to the two sides of the installation plates 312 respectively. The sides, away from the installation plates 312, of the connecting plates 313 are fixedly connected with the longitudinal push rods 311, and the output ends of the longitudinal push rods 311 are fixedly connected with the longitudinal translation plate 31. Longitudinal sliding rails 3131 are further arranged on the connecting plates 313 and connected with the longitudinal translation plate 31. Thus, when the longitudinal push rods 311 act, the longitudinal translation plate 31 can be pushed to make a translational movement relative to the swinging device 4. Meanwhile, a plurality of reinforcing plates 314 for improving the structural strength of the longitudinal translation plate 31 are further arranged on the sides, close to the swinging device 4, of the longitudinal translation plate 31, every two adjacent reinforcing plates 314 are spaced, and the longitudinal sliding rails 3131 extend into an interval between every two adjacent reinforcing plates 313. Thus, on one hand, the structural strength of the longitudinal translation plate 31 is improved, and on the other hand, the space is reserved for installation of the longitudinal sliding rails 3131, so that the longitudinal translation plate 31 is more compactly connected with the swinging device 4, and the volume of the cross translation device 3 can be reduced to a certain degree accordingly. Each transverse translation plate 32 is of an approximately rectangular plate structure, and is arranged in the direction parallel to gravity. The transverse translation plate 32 is clamped at the two ends of the longitudinal translation plate 31, that is, the sides, close to the longitudinal translation plate 31, of the transverse translation plate 32 are of approximately groove-shaped structures, and the longitudinal translation plate 31 is embedded into the grooves. The transverse translation plate 32 is provided with transverse push rods 321, installation portions 322, transverse sliding rails 323 and installation grooves 324. The installation portions 322 correspond to one end of the longitudinal translation plate 31, one end of each of the transverse push rods 321 is connected with the installation portions 322, and the output ends of the transverse push rods 321 are connected with the longitudinal translation plate 31. There are two transverse sliding rails 323, one is arranged at the ends, away from the transverse push rods 321, of the longitudinal translation plate 31, and the other is arranged on the sides, away from the swinging device 4, of the longitudinal translation plate 31. The transverse translation plate 32 is slidably connected with the longitudinal translation plate 31 through the transverse sliding rails 323. Thus, when the transverse push rods 321 act, the transverse translation plate 32 can be pushed to make a translational movement relative to the longitudinal translation plate 31. Meanwhile, corresponding groove-shaped structures are further arranged at the positions, corresponding to the transverse sliding rails 323, of the transverse translation plate 32, and the transverse sliding rails 323 extend into the groove-shaped structures, so that the transverse translation plate 32 is more compactly connected with the longitudinal translation plate 31, which facilitates reduction in the interval between the sucking device 1 and the swinging device 4. On the other hand, by arranging the positions of the transverse sliding rails 323 and the transverse push rods 321 in the above manner, the space around the longitudinal translation plate 31 is effectively utilized, and therefore the side faces, with the largest areas, of the longitudinal translation plate 31 and the transverse translation plate 32 can be in an approximate fitted state, which facilitates further reduction in the interval between the sucking device 1 and the swinging device 4. The installation grooves 324 are further formed in the sides, away from the longitudinal translation plate 31, of the transverse translation plate 32, and the rotating device 2 is arranged in the installation grooves 324. Thus, the transverse translation plate 32 is more compactly connected with the rotating device 2. In conclusion, due to the above structural arrangement, the interval between the sucking device 1 and the swinging device 4 is effectively reduced.

The swinging device 4 may be an oil cylinder, one side of the swinging device 4 is connected with the cross translation device 3, and the other side is connected with the mechanical arm 5. When the swinging device 4 acts, the cross translation device 3 can be driven to swing to one side of the mechanical arm 5.

The mechanical arm 5 may be of a structure shown in FIG. 1, and specifically comprises a pitching device 51, a telescopic device 52 and a secondary swinging device 53. The pitching device 51 comprises a transmission oil cylinder 511, a transmission connecting rod 512 and a main plate 513. The main plate 513 is connected with the swinging device 4 in a swinging manner. One end of the transmission connecting rod 512 is connected with the main plate 513 in a swinging manner, and the other end is connected with the swinging device 4 in a swinging manner. One end of the transmission oil cylinder 511 is connected with the main plate 513 in a swinging manner, and the other end is connected with the transmission connecting rod 512 in a swinging manner. Thus, when the transmission oil cylinder 511 acts, the swinging device 4 can be driven to swing relative to the main plate 513 by the transmission connecting rod 512 so that the swinging device 4 can pitch up or down. One end of the telescopic device 52 is connected with the pitching device 51, and the other end is connected with the secondary swinging device 53 in a swinging manner. When the telescopic device 52 acts, the pitching device 51 can be driven to extend out or draw back. The secondary swinging device 53 may also be an oil cylinder.

During actual use, after the mechanical arm 5 is connected and installed on a lifting arm B capable of making substantial lifting movement in a vertical direction, the lifting arm can be fixedly installed on a mobile bearing rack C with wheels at the bottom, thus, a whole can be formed by the above sucking type transferring device A, the lifting arm B and the mobile bearing rack C, and the building material installation equipment with high flexibility can flexibly move under various road environment conditions, and meanwhile can conveniently grasp, transfer and fixedly install glass, decorative sheets and other workpieces at high altitude. The sucking type 1 is used for sucking the panels to be installed, and then the mechanical arm or equipment on the engineering trolley is used for lifting the sucking device 1 sucking the panels to a designated installation height. Then, the panels are adjusted in multiple dimensions through the rotating device 2, the cross translation device 3, the swinging device 4 and the mechanical arm 5, so the panels can align at designated installation positions. When encountering the groove-shaped narrow installation space, after the sucking device 1 sucks the panels, the swinging device 4 is controlled to act to make the cross translation device 3 swing to one side of the mechanical arm 5. As the structural layout of the cross translation device 3 is compact, the interval between the sucking device 1 and the swinging device 4 is reduced, and then the equipment can more easily extend into the narrow installation space; and on the other hand, the overall length of the installation equipment is reduced, which facilitates improvement in the bearing performance of the installation equipment. Meanwhile, after the sucking device 1 is lifted to the designated height, an included angle is bound to exist between the mechanical arm 5 and a horizontal plane, and after the cross translation device 3 swings to one side of the mechanical arm 5, the panels can align at the installation positions only after the rotating device 2 drives the sucking device 1 to rotate by a certain angle. The higher the lifting height, the larger the included angle between the mechanical arm and the horizontal plane is perceived to be, and the larger the rotating angle needed by the rotating device 2 will get. By means of the slip ring 21, the rotation angle of rotating device 2 will not be limited, so different rotating and adjusting requirements can be met. After the panels align at the installation positions, the positions of the panels can be finally finely adjusted by the cross translation device 3. In conclusion, the equipment of the present disclosure still has high flexibility when encountering the special working condition of the narrow installation space, so installation requirements can be effectively met.

The above descriptions are merely specific implementations of the present disclosure, which are not intended to limit the protection scope of the present disclosure. Various equivalent changes or replacements which are easily conceived by any person skilled in the art within the technical scope disclosed in the present disclosure should fall within the protection scope of the present disclosure. Thus, the protection scope of the present disclosure should follow the protection scope of claims.

What is claimed is:

1. Building material installation equipment with flexibility, comprising: a sucking device for sucking panels, a rotating device for driving the sucking device to rotate, a cross translation device, a swinging device and a mechanical arm; wherein
   a slip ring is arranged in the rotating device and electrically connected with the sucking device to supply power and transmit electric signals to the sucking device;
   the cross translation device comprises a longitudinal translation plate and a transverse translation plate which is capable of driving the sucking device to make a translational movement;
   the longitudinal translation plate and the transverse translation plate are both overall arranged in an upright state parallel to a vertical direction, and are arranged and connected in a mutually nested and fitted manner;
   the swinging device is capable to drive the cross translation device to swing to one side of the mechanical arm;
   the longitudinal translation plate is slidably connected with the swinging device, and longitudinal push rods are arranged on the longitudinal translation plate, when the longitudinal push rods are pushed, the longitudinal translation plate is pushed to make a translational movement relative to the swinging device;

an installation plate and a connecting plate are arranged on the same side of the longitudinal translation plate;

the installation plates are clamped at two ends of the swinging device respectively;

two sides of the connecting plate are connected with the installation plates and the longitudinal push rods respectively; and longitudinal sliding rails are further arranged on the connecting plates and connected with the longitudinal translation plate.

2. The building material installation equipment with flexibility according to claim 1, wherein, a plurality of reinforcing plates are further arranged on the sides, adjacent to the swinging device, of the longitudinal translation plate; the adjacent reinforcing plates are spaced; and the longitudinal sliding rails extend into an interval between two adjacent reinforcing plates.

3. The building material installation equipment with flexibility according to claim 1, wherein, the transverse translation plate is slidably connected with the longitudinal translation plate and connected with the sucking device through the rotating device; and transverse push rods are arranged on the transverse translation plate, when the transverse push rods are pushed, the transverse translation plate is pushed to make the translational movement relative to the longitudinal translation plate.

4. The building material installation equipment with flexibility according to claim 3, wherein, two ends of the transverse translation plate are respectively connected to two ends of the longitudinal translation plate; transverse sliding rails are arranged between the transverse translation plate and the longitudinal translation plate; installation portions are further arranged on the transverse translation plate; the installation portions are used for installing the transverse push rods; and the installation portions are arranged at the ends of the longitudinal translation plate.

5. The building material installation equipment with flexibility according to claim 4, wherein, there are two transverse sliding rails which are arranged on the upper and lower sides of the longitudinal translation plate respectively;

the upper transverse sliding rail is arranged at the end, away from the transverse push rods, of the longitudinal translation plate; and the lower transverse sliding rail is arranged on the side, away from the swinging device, of the longitudinal translation plate.

6. The building material installation equipment with flexibility according to claim 3, wherein, installation grooves are further formed in the sides, away from the longitudinal translation plate, of the transverse translation plate; and the rotating device is arranged in the installation grooves.

7. The building material installation equipment with flexibility according to claim 1, wherein, the sucking device comprises a plurality of suckers and a support for installing the suckers;

the support is connected with the rotating device; and the suckers are electrically connected with the slip ring.

8. The building material installation equipment with flexibility according to claim 1, wherein, a rotating ring is arranged on the rotating device;

the rotating ring is connected with the sucking device; and a central axis of the slip ring coincides with a rotating axis of the rotating ring.

* * * * *